April 8, 1958  J. B. GODSHALK ET AL  2,829,705
GARDENER'S UTENSIL
Filed Nov. 9, 1954  2 Sheets-Sheet 1
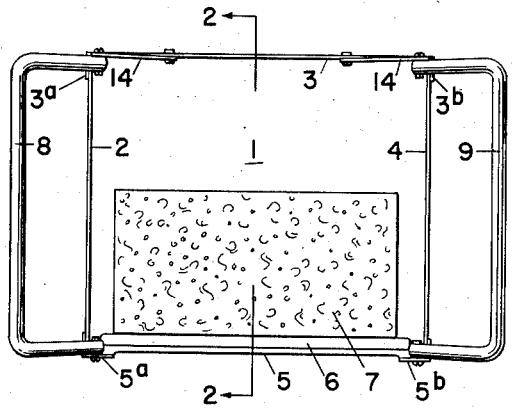
FIG. 1
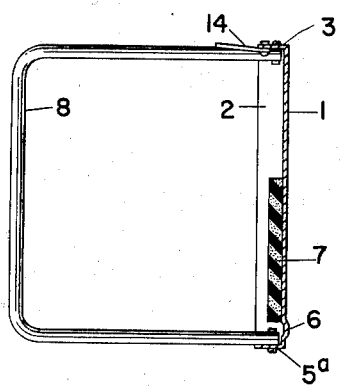
FIG. 2
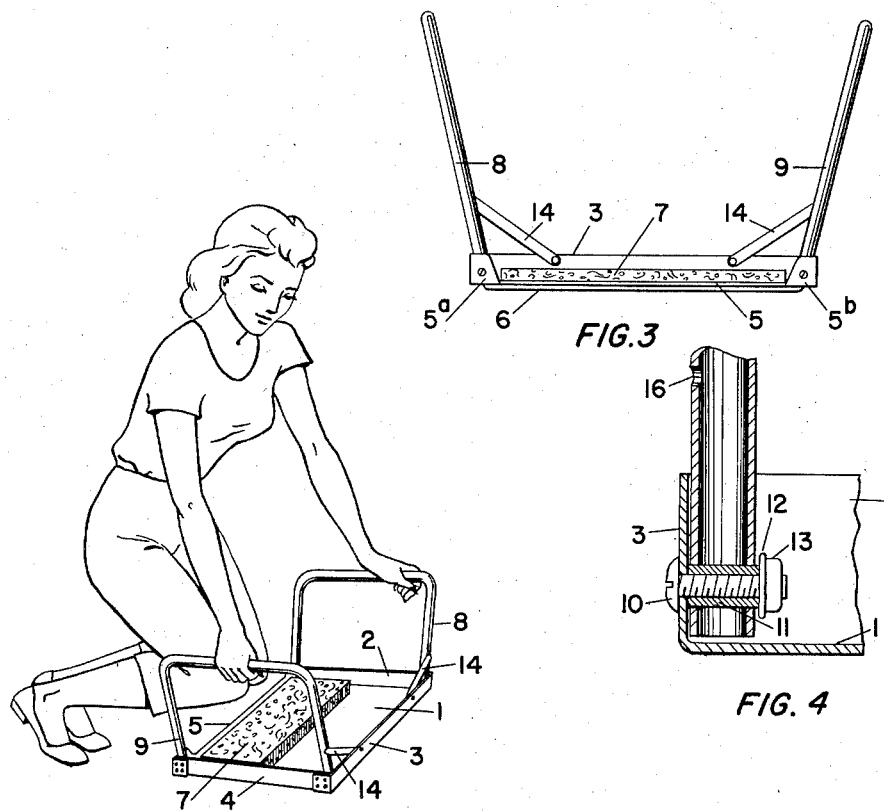
FIG. 3
FIG. 4
FIG. 5
INVENTORS
JAMES B. GODSHALK
GEORGE F. STONE
BY
Stone, Boyden & Mack
Attys.

April 8, 1958  J. B. GODSHALK ET AL  2,829,705
GARDENER'S UTENSIL

Filed Nov. 9, 1954  2 Sheets-Sheet 2

INVENTORS
JAMES B. GODSHALK
BY GEORGE F. STONE

Stone, Boyden & Mack
Attys.

United States Patent Office 2,829,705
Patented Apr. 8, 1958

2,829,705

GARDENER'S UTENSIL

James B. Godshalk, West Pikeland Township, Chester County, and George F. Stone, Philadelphia, Pa., assignors to Fox Products Company, Philadelphia, Pa., a corporation of Pennsylvania Application November 9, 1954, Serial No. 467,779

1 Claim. (Cl. 155—167)

This invention relates to gardener's utensils and more particularly to an improved multi-purpose utensil so constructed that it may be employed either as a kneeling device to cushion the user's knees and aid the user in kneeling and arising, or as a hand tray for carrying seeds, small tools or like articles, or as a stool.

There has long been a demand, particularly by home gardeners, for a practical kneeling device which will not only form a cushion under the knees but also aid the user both in kneeling and arising. Such devices have found considerable favor, particularly with elderly persons, and a number of such products have been successfully marketed in the past. These utensils have not been entirely satisfactory, however, because they have been somewhat more bulky and expensive than is justified by their limited purpose.

The present invention provides a utensil of this general type characterized by a novel construction which, while very simple and inexpensive, makes the device suitable for several different purposes. Thus, the invention provides a body, a cushion, and handle members arranged for use as a kneeling device in a manner somewhat similar to prior art devices of this type. But the handle members are so constructed and so arranged with respect to the remainder of the device that they may be manipulated to convert the utensil to a hand tray or to a stool.

In order that the invention may be understood in detail, reference is had to the accompanying drawings which form a part of this specification and wherein:

Fig. 1 is a plan view of a multi-purpose gardener's utensil constructed in accordance with one embodiment of the invention, illustrating the elements thereof in position for use as a kneeling device;

Fig. 2 is a transverse vertical sectional view taken on the line 2—2, Fig. 1;

Fig. 3 is a side elevational view of the device of Fig. 1;

Figure 6:
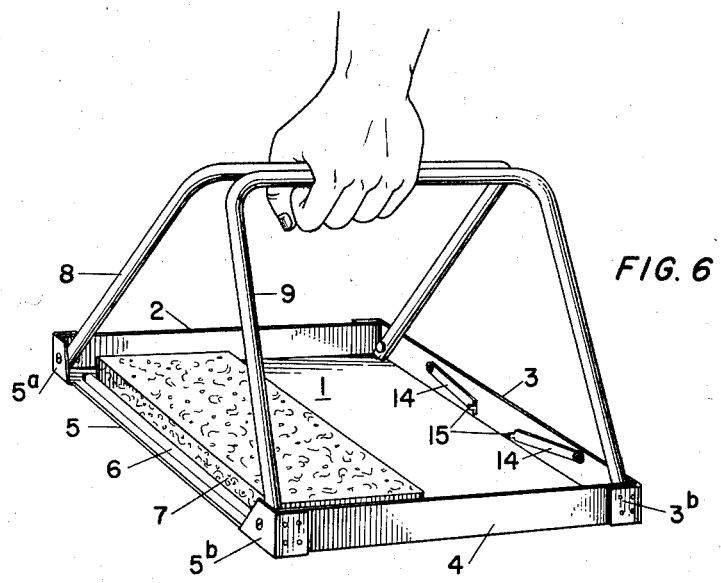
Figure 7:
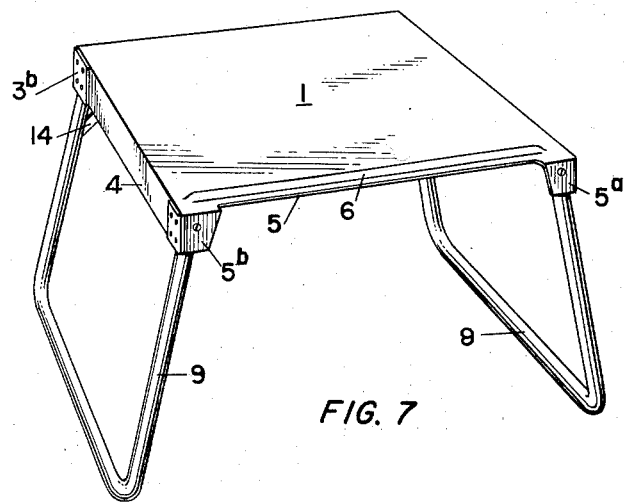

Fig. 4 is a fragmentary longitudinal sectional view, on an enlarged scale, through the forward leg of the bail 9 of the device of Fig. 1, the section being taken looking outwardly of the device toward side flange 4, with the member 14 omitted for clarity;

Fig. 5 is a perspective view illustrating the manner in which the utensil of Fig. 1 is employed as a kneeling device;

Fig. 6 is a perspective view illustrating the manner in which said device is employed as a tray, and Fig. 7 is a perspective view illustrating the manner in which said device is employed as a stool.

Referring now to the drawings in detail, it will be seen that the embodiment of the invention here illustrated comprises a sheet metal body 1 of rectangular form, one surface thereof being partially enclosed by edge flanges 2, 3 and 4. The flanges 2—4 are integral with the body 1, being formed by bending up the marginal portion of the sheet metal body. To assure rigidity, end portions of the flange 3 are bent back to extend along the flanges 2 and 4, respectively, as seen at 3a and 3b, and welded in place. Similarly, the body 1 is provided, adjacent open edge 5, with ears 5a and 5b having portions extending parallel with edge 5 and other portions extending along and welded to the flanges 2 and 4, respectively. Adjacent the edge 5, the body 1 is provided with a stiffening rib 6.

A rectangular kneeling cushion, advantageously comprising a sheet of sponge rubber, is attached to the surface of body 1, as by cementing, and extends substantially completely between the ears 5a and 5b. It will be noted that the kneeling cushion 7 is considerably narrower than the body 1, so that an open space is left between the kneeling cushion 7 and the forward flange 3. Thus, the flanges 2—4 and the kneeling cushion 7 cooperate to enclose a shallow tray area which may be used to carry seeds, small tools, and the like.

Pivotally attached to the body 1 are identical bails 8 and 9 of generally U-shaped configuration. The bails are advantageously formed of tubular steel or the like and have the ends of their legs pivotally connected to the body 1 along axes each extending parallel to but faced somewhat inwardly from the side flanges 2 and 4, respectively. As seen in Fig. 4, such pivotal connection is provided by means of bolts 10 extending through the flange 3 and ears 5a and 5b and carrying sleeves 11 each positioned in a bore extending transversely through the end portion of a leg of the bail. The pivotal connection is completed by a lock washer 12 and nut 13.

Since the bails 8 and 9 are pivotally connected along axes parallel to and spaced somewhat inwardly from the flanges 2 and 4, the bails may be swung outwardly into engagement with the flanges 2 and 4, as best seen in Figs. 3 and 5, in which position the flanges brace the bails against further outward movement. With the bails in this position, the base portions of the bails may be grasped by the user, as seen in Fig. 5, so that the bails will serve to aid the user either in going into the kneeling position or in rising therefrom.

As seen in Fig. 6, the bails 8 and 9 are of such length that they may be swung inwardly and brought substantially into contact one with the other to form a centered handle located at a convenient distance above the body 1. In this position, the device may be carried by such centered handle, with kneeling cushion up, so that the user may employ the utensil as a tray to carry seeds, small tools, etc. from one point in the garden to another.

Fig. 7 illustrates a third position of use of the utensil, in which the device is placed in inverted position with kneeling cushion 7 downward and with the bails 8 and 9 pivoted outwardly into engagement with flanges 2 and 4, respectively. In this position, the bails serve as legs, so that the device may be employed as a garden stool.

In order to positively retain the bails 8 and 9 in outward position, particularly when the device is employed as a kneeling stool, we provide latch members 14 each pivoted at one end to forward edge flange 3. At their free ends, latch members 14 are each provided with hook portions 15, Fig. 6, extending rearwardly of the body 1. At appropriate points above the body 1, the forward legs of bails 8 and 9 are provided with forwardly directed openings 16, Fig. 4, adapted to receive the hooked ends 15 of latch members 14.

When the device is employed as a tray, the latch members 14 are pivoted inwardly to inactive position, as seen in Fig. 6. When it is desired to latch the bails 8 and 9 in outward position, the latch members 14 are pivoted upwardly and outwardly, and at the same time bent slightly forwardly, until the hooked ends 15 snap into the openings 16. The latch members 14 may be made of relatively thin sheet steel or the like in order to provide resiliency sufficient to allow ready engagement and disengagement of the latch members with openings 16.

What is claimed is:

In a gardener's utensil of the type described, the combination of a flat quadrilateral body portion having edge flanges on three sides only all extending outwardly for a material distance from the same surface of said body portion, a pair of bails pivotally connected to said body portion on oppositely disposed paralled axes each adjacent to but spaced from a different one of said edge flanges whereby said bails may be pivoted outwardly into engagement with the respective adjacent edge flanges to serve as legs enabling the utensil to be used as a stool or as hand holds enabling the utensil to be used as a kneeling device, said bails being of such length that they may be swung inwardly substantially into engagement one with the other at a point a substantial distance from said body portion to form a centered handle by which the utensil may be carried as a tray, and a kneeling cushion attached to said surface of said body portion and being substantially narrower than said surface of said body portion in a direction parallel to said axes, said kneeling cushion extending along the fourth side of said body portion and cooperating with said edge flanges to substantially enclose an area of said surface not covered by the cushion, said area so enclosed constituting a tray area for receiving seeds, tools and the like when the utensil is carried as a tray.

References Cited in the file of this patent

UNITED STATES PATENTS

| 155,706 | Cahill | Oct. 6, 1874 |
| 162,617 | Brightman | Apr. 27, 1875 |
| 1,345,253 | House | Sept. 28, 1920 |
| 1,369,780 | Burgess | Mar. 1, 1921 |
| 2,139,248 | Upton | Dec. 6, 1938 |
| 2,318,416 | Peirce | May 4, 1943 |
| 2,508,627 | Spiegel | May 23, 1950 |
| 2,619,154 | Erickson | Nov. 25, 1952 |